United States Patent
Ostwald et al.

(10) Patent No.: US 6,499,928 B2
(45) Date of Patent: Dec. 31, 2002

(54) LIBRARY SERVICE PORT

(75) Inventors: Timothy C. Ostwald, Louisville, CO (US); Daniel James Plutt, Superior, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 10/106,407

(22) Filed: Mar. 26, 2002

(65) Prior Publication Data

US 2002/0098064 A1 Jul. 25, 2002

Related U.S. Application Data

(63) Continuation of application No. 09/481,901, filed on Jan. 12, 2000, now Pat. No. 6,409,450.

(51) Int. Cl.[7] .............................................. B65G 65/00
(52) U.S. Cl. ......................... 414/277; 414/279; 360/92
(58) Field of Search ................................ 414/277, 279; 360/92

(56) References Cited

U.S. PATENT DOCUMENTS

| | | | |
|---|---|---|---|
| 5,164,909 A | 11/1992 | Leonhardt et al. | |
| 5,291,001 A | 3/1994 | Krayer et al. | |
| 5,449,229 A | 9/1995 | Aschenbrenner et al. | |
| 5,546,315 A | 8/1996 | Kleinschnitz | |
| 5,914,919 A | 6/1999 | Fosler et al. | |
| 6,175,539 B1 | 1/2001 | Holmquist et al. | |
| 6,198,594 B1 | 3/2001 | Utsumi et al. | |
| 6,222,699 B1 | 4/2001 | Luffel et al. | |

*Primary Examiner*—Steven A. Bratlie
(74) *Attorney, Agent, or Firm*—Brooks & Kushman P.C.

(57) ABSTRACT

A data storage library and method of operation are disclosed wherein access at least to part of at least one robotic mechanism from the data storage library's exterior is permitted. Access is accomplished through a service port in the library's housing. Access to the storage cells, and thus the data cartridges sitting therein, from the library's exterior is blocked. Blocking access to the storage cells may be provided by a geometry of the service port itself, or by a combination of a door and the robotic mechanism being serviced filling the opening created by the service port. For robotic mechanisms operating on a track, part of the track may be routed through the service port to bring the robotic mechanisms to the exterior of the library for maintenance purposes.

6 Claims, 6 Drawing Sheets

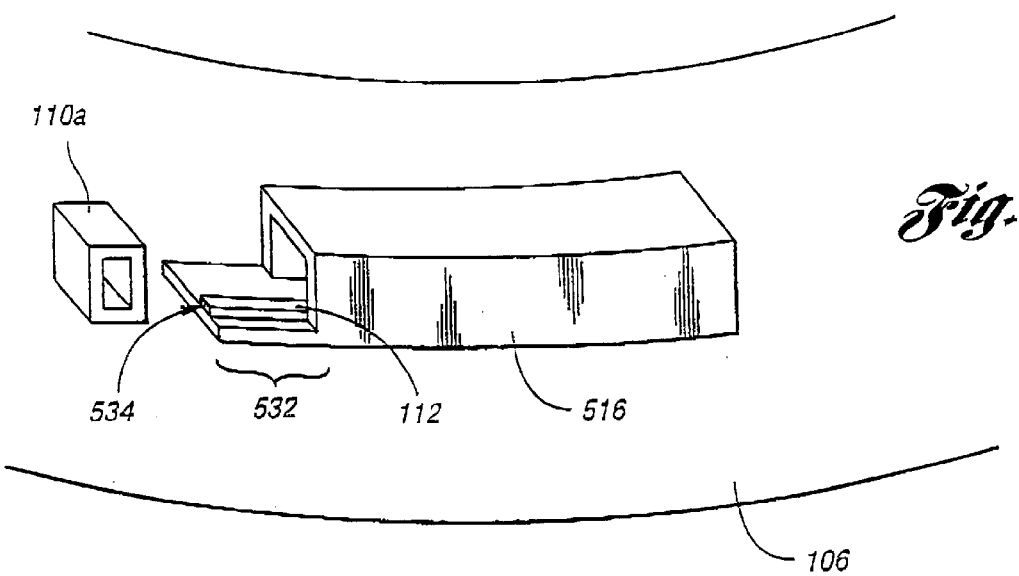
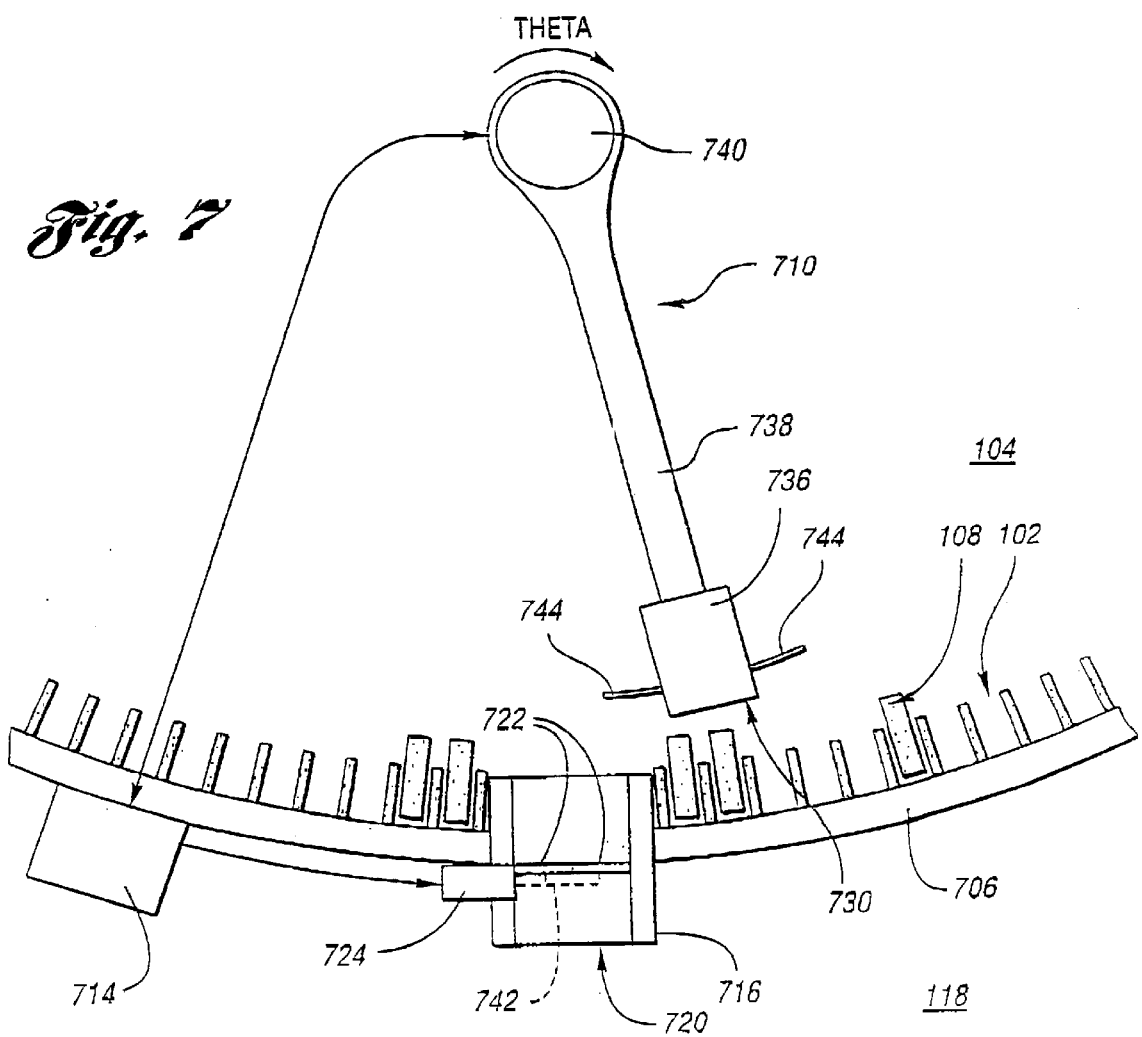

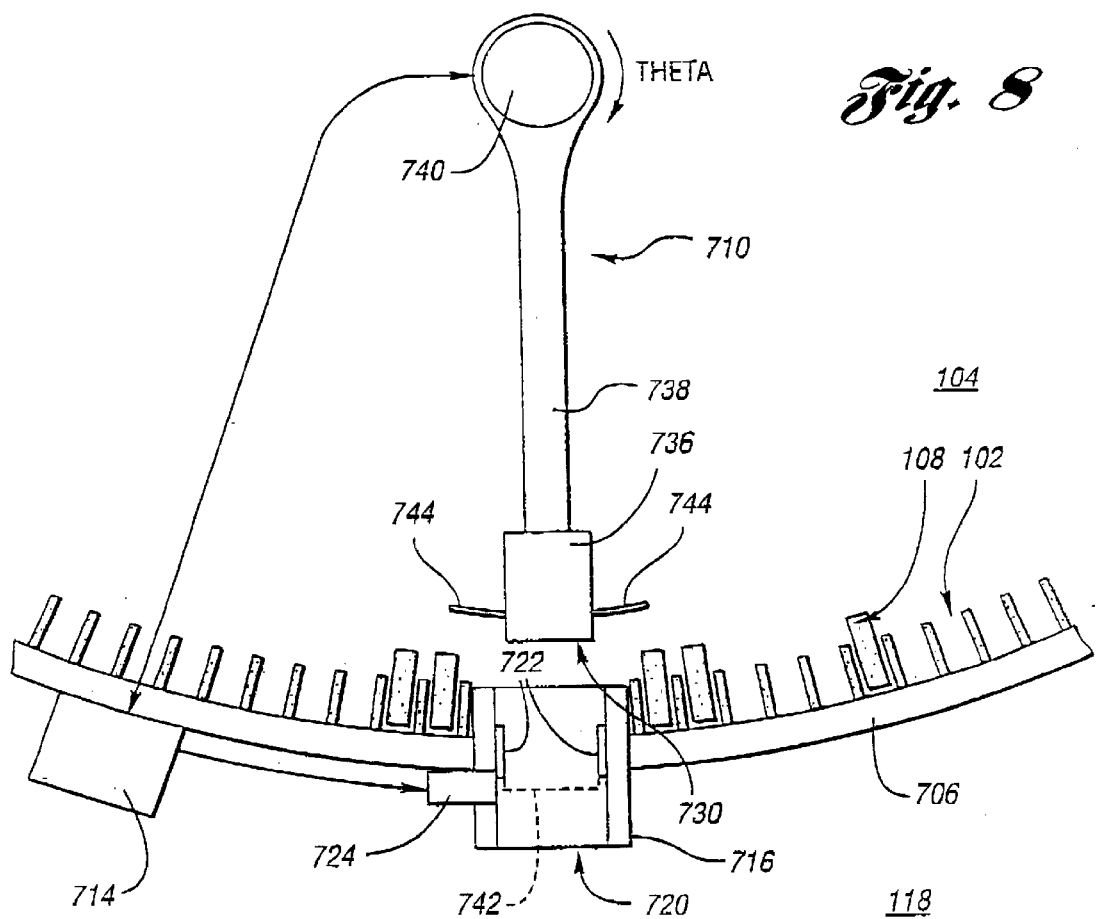
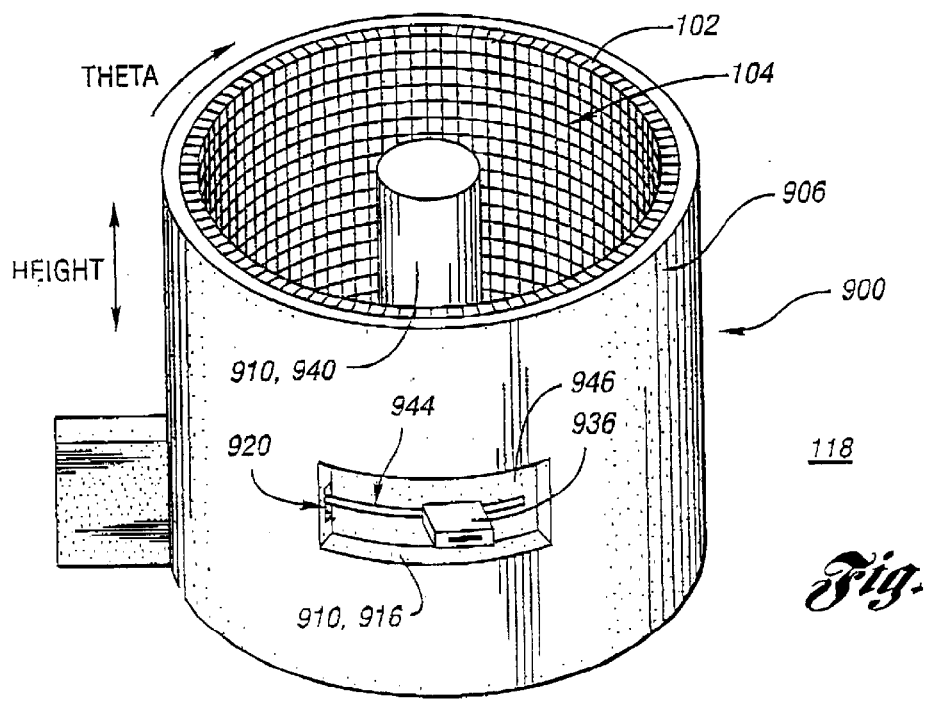

LIBRARY SERVICE PORT

The present application is a continuation of U.S. patent application Ser. No. 09/481,901 filed Jan. 12, 2000 now U.S. Pat. 6,409,450.

TECHNICAL FIELD

The present invention relates to the field of automated data storage libraries having robotic mechanisms.

BACKGROUND ART

Automated data storage libraries incorporate one or more robotic mechanisms for moving data cartridges around within the library. From time to time, these robotic mechanisms require maintenance actions. Maintenance is usually performed through a service door in the library's housing that allows personnel to access robotic mechanisms inside the library. All of the robotic mechanisms within the library are usually shut down any time the service door is open. This shut down is done for the safety of the personnel performing the maintenance on the robots.

The approach of shutting down the robotic mechanisms during maintenance is costly to the automated data storage library owner in terms of down time of the library and security for the data within. The library can perform no useful work while the service door is open and all of the robots are shut down. Even if maintenance is required on only one robotic mechanism, the other robots must be stopped in order to avoid possible collisions with the personnel. This means that no new data cartridges can be mounted into the read/write drives, and data cartridges currently in the read/write drives cannot be dismounted during maintenance operations.

The open service door also raises a question of security for the data cartridges within the library. Once personnel have access to the interior of the library, it is easy for them to add, remove, or rearrange the data cartridges resting in the library's storage cells. An audit of all data cartridges within the library is usually performed once the service door has been closed to verify that no manual manipulation of the data cartridges had taken place. For small libraries containing only a few data cartridges, an audit can be completed in several minutes. Very large data storage libraries containing thousands of data cartridges may require more than one hour to complete an audit. At a minimum, productive time of the library is lost during the audit. In a worse case scenario, data within the library has been either corrupted or lost.

What is desired is an approach that allows access to the robotic mechanisms from the exterior of the library while simultaneously blocking access to the data cartridges stored within. In large library systems containing multiple robots, it is desirable that the robots not being serviced are allowed to continue their normal operations. Preferably, the approach also blocks personnel access to these active robots while the one robot is being serviced.

DISCLOSURE OF INVENTION

The present invention is a data storage library and method of operation in which access to at least part of at least one robotic mechanism is permitted from an exterior region around the library while access to the multiple storage cells on the interior of the library is blocked. A service port provides access through the housing of the library to the robot mechanism being serviced. Access to the storage cells is blocked by either the geometry of the service port itself, or a combination of a door covering the service port and the robot mechanism being serviced.

In data storage libraries having robots operating along tracks, a portion of the track may be routed through the service port. This portion of track allows the entire robotic mechanism to be brought to the library's exterior for maintenance purposes. In one embodiment, a mechanical stop is provided at the end of the track to keep the robotic mechanism from leaving the track. In an alternative embodiment, one end of the track is kept open to allow the robots to be removed from and installed back on the track as required.

Accordingly, it is an object of the present invention to provide a data storage library and method for permitting access to at least part of at least one robotic mechanism from the exterior of the library through a service port, while blocking access to the plurality of storage cells from the exterior through the service port.

Another object of the present invention is to provide a data storage library and method for accessing one robotic mechanism of a multiple robotic mechanism system while leaving the remaining robotic mechanisms inaccessible.

These and other objects, features and advantages will be readily apparent upon consideration of the following detailed description in conjunction with the accompanying drawings.

BRIEF DESCRIPTION OF DRAWINGS

FIG. 6 is a partial perspective view of the second embodiment of the service port;

FIG. 7 is a partial overhead cross-sectional view of a second embodiment of the data storage library having a concentric robotic mechanism;

FIG. 8 is a partial overhead cross-sectional view of the second data storage library with the robotic mechanism aligned with the service port;

FIG. 9 is a perspective view of a third embodiment of the data storage library;

BEST MODE FOR CARRYING OUT THE INVENTION

Figure 1:
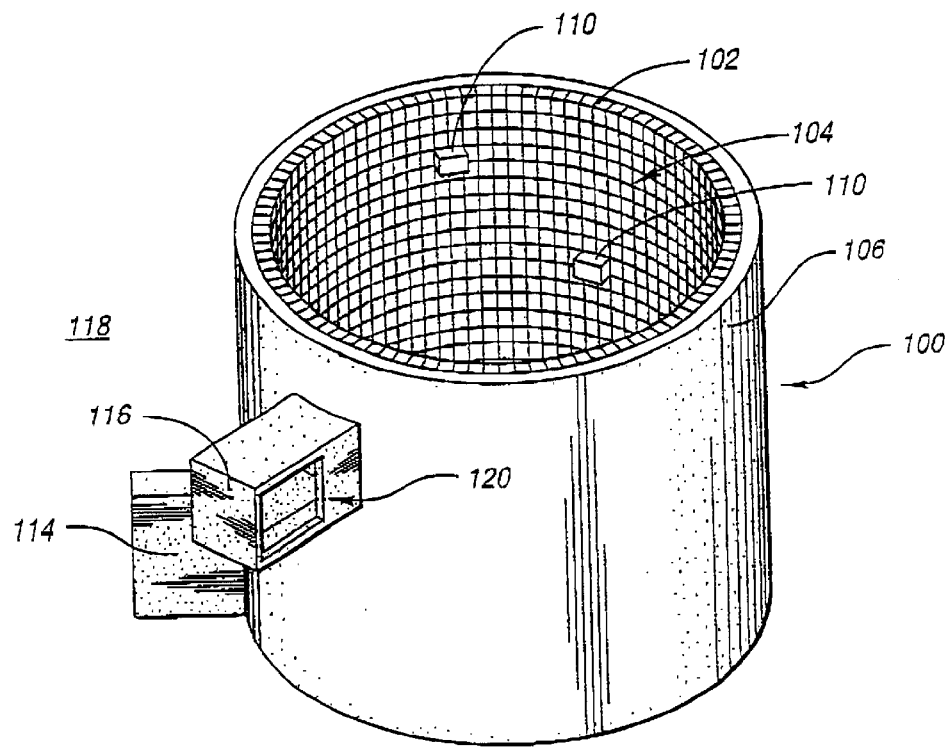
FIG. 1 is a perspective view of a typical data storage library implementing the present invention.
Figure 2:
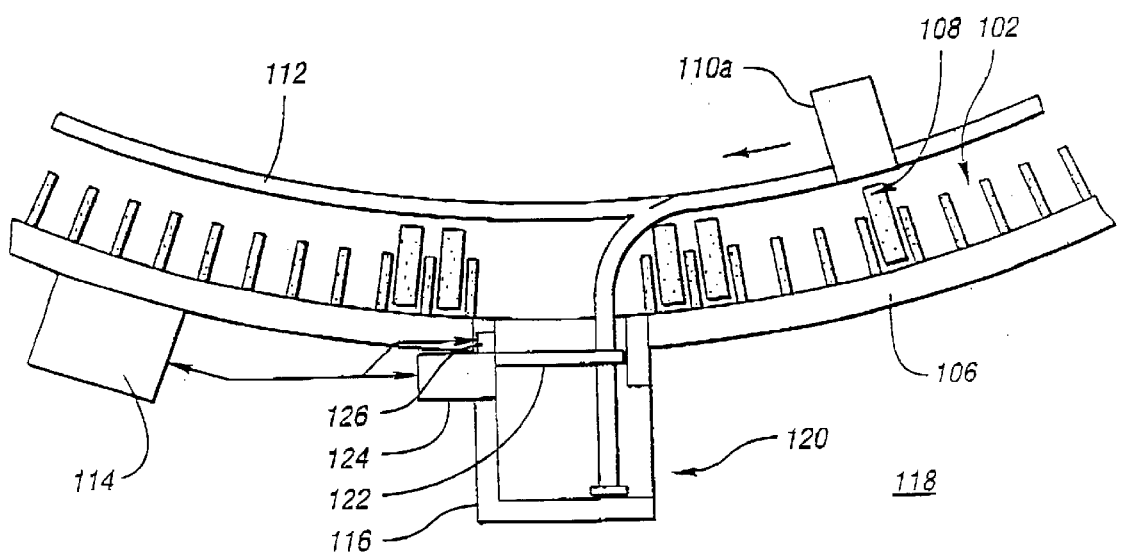
FIG. 2 is a partial overhead cross-sectional view of the data storage library showing a robotic mechanism is approaching the service port.

FIG. 1 is a prospective view of a typical data storage library 100 implementing the present invention. The data storage library 100 consists of a plurality of stored cells 102 mounted in an interior region 104 of a housing 106. Each storage cell 102 may hold one data cartridge 108 (not shown), such as a magnetic tape or optical disk. Multiple robotic mechanisms 110 operating along tracks 112 (as shown in FIG. 2) are used to move the data cartridges 108 about within the data storage library 100. A library control unit 114 provides control and coordination of the robotic mechanisms 110. A service port 116 is provided through the library housing 106 to permit access to one of the robotic mechanism 110 at a time. In operation, the library control unit 114 will command the desired robotic mechanism 110 to move into the service port 116. Once there, personnel (not shown) standing in the exterior region 118 of the library 100 can reach through an opening 120 in the service port 116 to get to the active side of the desired robotic mechanism 110. While the robotic mechanism 110 being serviced is positioned within the service port 116, the other robotic mechanisms 110 within the library 100 may continue their normal operations. This avoids a need to shut down the entire library 100 to service the one robotic mechanism 110.

FIG. 2 is a partial overhead cross-sectional view showing the data storage library 100 region surrounding the service port 116. Here, the desired robotic mechanism 110a to be serviced can be seen moving along the track 112 toward the service port 116.

A door 122, positioned within the service port 116, blocks access from the exterior region 118 through the service port 116 to the interior region 104 of the data storage library 100. This door 122 in a closed position effectively disables the service port 116 by preventing personnel from reaching into the data storage library 100. Door 122 is shown as a single panel hinged on one side for illustrative purposes only. It is known in the art that the door 122 may be made from one or several panels that rotate, pivot, slide, raise, lower, or otherwise move between open and closed states. It may be positioned inside the service port 116, as shown in FIG. 2, or it may be positioned to the interior or exterior sides of the service port 116.

Figure 3:
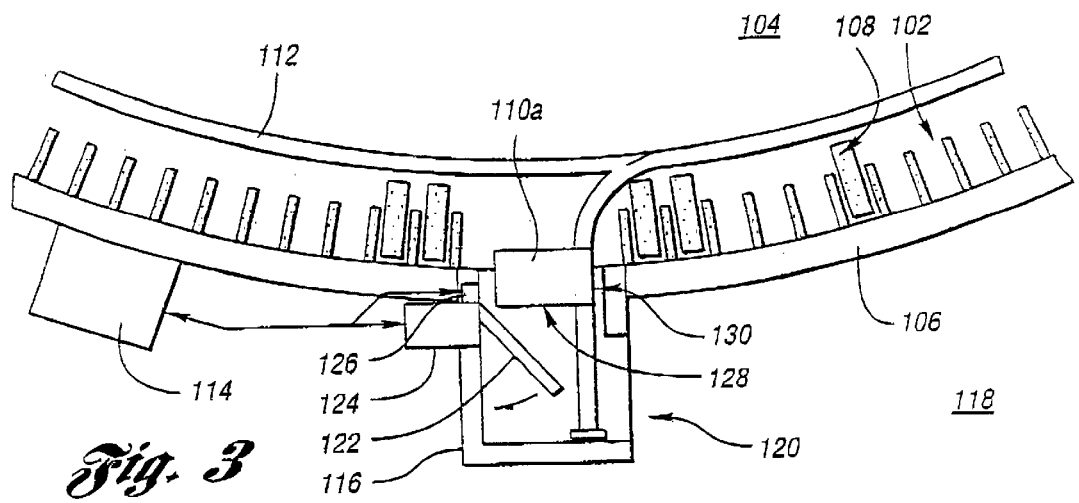
FIG. 3 is a partial overhead cross-sectional view of the data storage library showing the robotic mechanism entering the service port.
Figure 4:
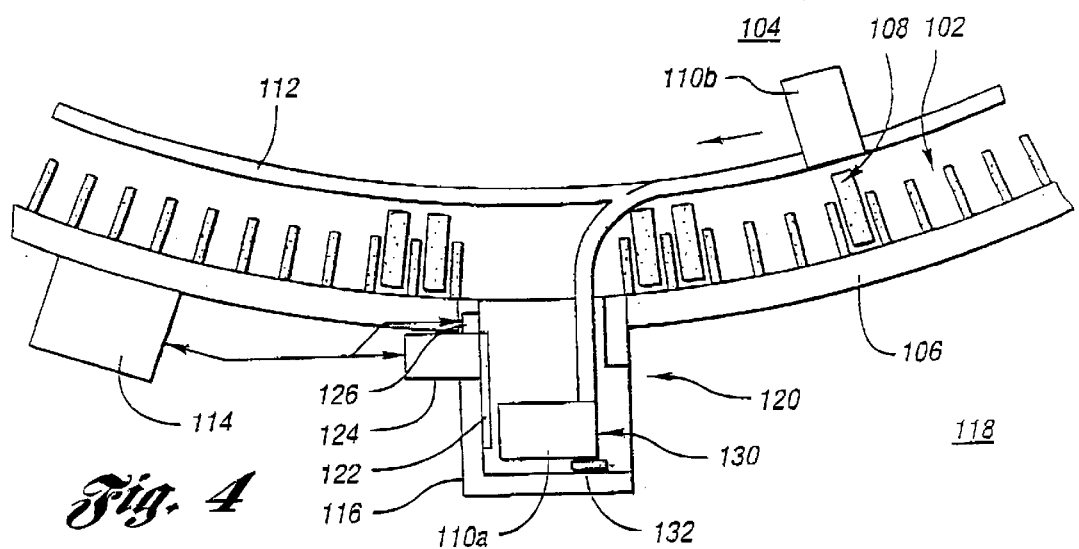
FIG. 4 is a partial overhead cross-sectional view of the data storage library showing the robotic mechanism inside the service port.
Figure 3A:
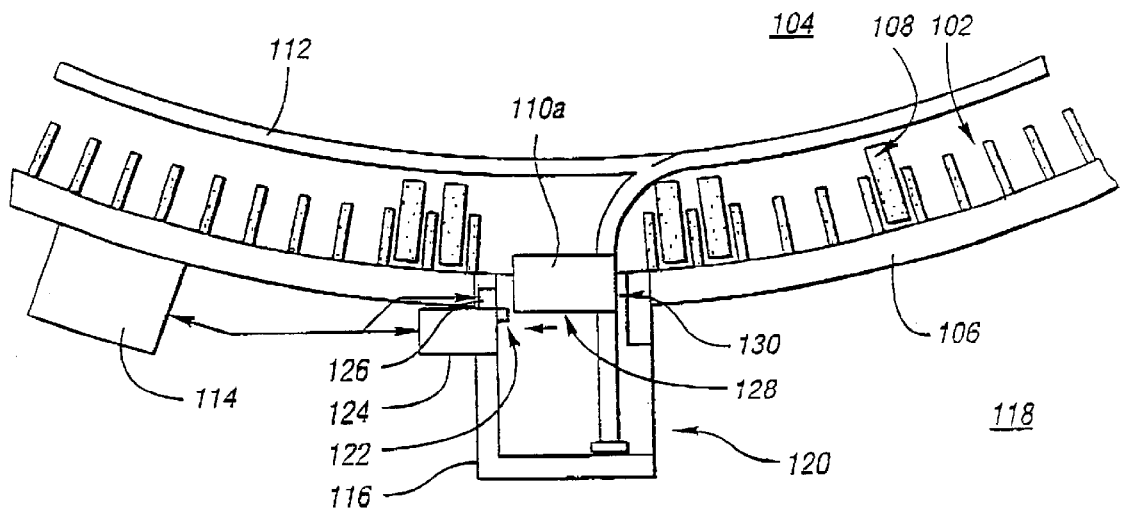
FIG. 3a is a partial overhead cross-sectional view of another data storage library showing the robotic mechanism entering the service port.
Figure 4A:
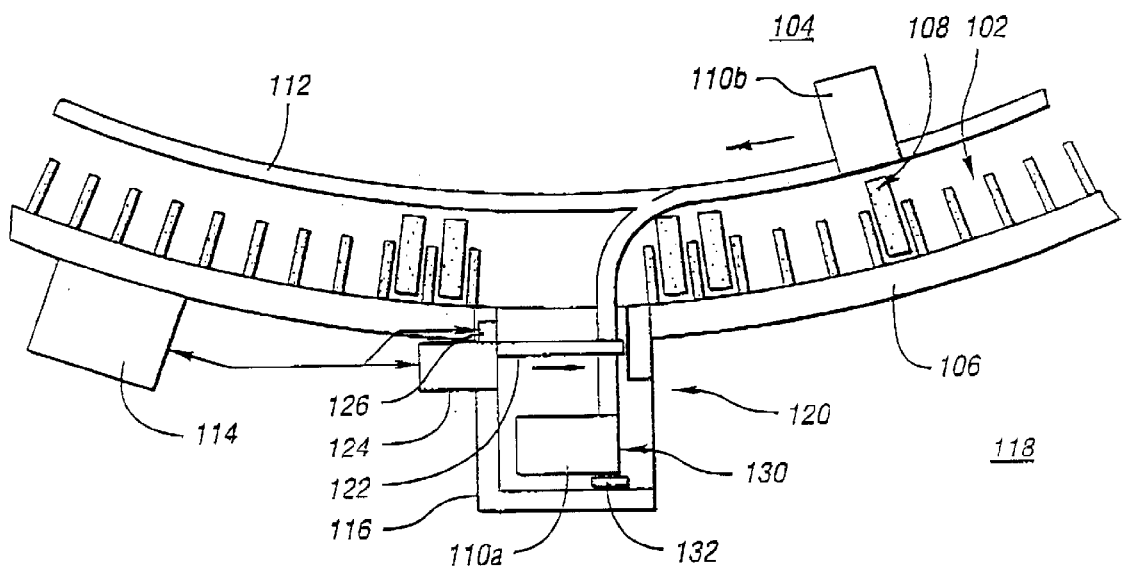
FIG. 4a is a partial overhead cross-sectional view of another data storage library showing the robotic mechanism inside the service port.

(See, e.g., FIGS. 3a and 4a showing door 122 sliding between open and closed states, respectively, as robotic mechanism 110a enters service port 116.)

A motor 124 provides mechanical power to open and close door 122. Motor 124 may be controlled through the library control unit 114 and/or through a sensor 126.

Sensor 126 is used to detect when a robotic mechanism 110 is aligned with the door 122. It may be a proximity sensor, position sensor, or the like. Sensing may be accomplished by electromechanical, magnetic, optical, acoustic or any other suitable means for detecting the robotic mechanism 110. Sensor 126 is generally, although not necessarily, positioned between the door 122 and the interior region 104 of the library 100. In the preferred embodiment, it is connected to the library control unit 114. In an alternative embodiment, it is connected to the motor 124.

Referring to FIG. 3, as the desired robotic mechanism 110a aligns itself with the interior region 104 side of the service port 116, the sensor 124 detects the presence of the desired robotic mechanismi 110a. Motor 124 then moves the door 122 from its closed position to an open position. With the door 122 in an open position, the service port 116 is enabled, allowing personnel to see and reach the desired robotic mechanism 110a through the service portl 16. From this position, one side 128 of the desired robotic mechanism 110a is facing the exterior region 118. To provide access to the active side 130 of the desired robotic mechanism 110a, the desired robotic mechanism 110a may be moved further into the service port 116. Movement is halted when the active side 130 is aligned with the opening 120, as shown in FIG. 4, or the desired robotic mechanism 110a reaches a mechanical stop 132 at the end of the track 112.

Maintenance may be performed on the desired robotic mechanism 110a from the position shown in FIG. 4. Maintenance includes, but is not limited to, adjusting, cleaning, and the replacement of parts serviceable from the active side 130 of the desired robotic mechanism 110a. Note that while maintenance is being performed on the desired robotic mechanism 110a sitting in the service port 116, other robotic mechanisms 110b may continue to operate on the track 112 within the housing 106. The approach allows the data storage library 100 to remain operational while maintenance is being performed on the desired robotic mechanism 110a.

After maintenance has been completed, the desired robotic mechanism 110a can be returned to the interior region 104 of the data storage library 100. After the sensor 126 detects that the desired robotic mechanism 110b has gone past the door 122 on its way back into the interior region 104, the motor 124 closes the door 122. The desired robotic mechanism 110a is now free to move away from the service port 116 and resume its normal duties. The closed door 122 disables the service port 116 by blocking all access to the interior region 104 through the service port 116. Blocking in this case includes access to data cartridges 108 within the storage cells 102, and access to the other robotic mechanisms 110b.

Because access to the storage cells 102, and the data cartridges 108 therein, is blocked always, there is no need to perform an audit of the data cartridges 108 upon completion of a maintenance task on the desired robotic mechanism 110a. This feature of the present invention may save from minutes to hours of useful operational time for the data storage library 100 that would otherwise be lost to the audit.

Figure 5:
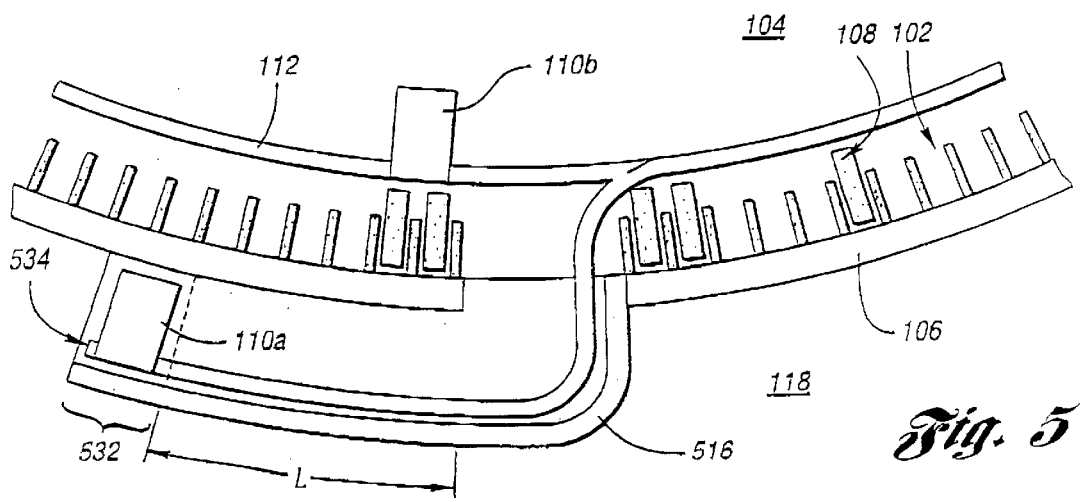
FIG. 5 is a partial overhead cross-sectional view of the data storage library showing an alternative embodiment of the service port without doors.

FIG. 5 and FIG. 6 show an alternative embodiment of the service port 516 without a door. Here, the functionality of blocking access to the interior region 104 is performed by the geometry of a service port 516. It becomes impossible for the personnel (not shown) to manipulate their arms through the right angle turn to reach the interior region 104 when the service port 516 is extended along the exterior of housing 106 a suitable distance. The suitable distance is typically one to four feet, as shown by length L. On the other hand, the robotic mechanisms 110 and track 112 can be designed to traverse this right angle turn.

The end of the service port 516 opening to the exterior region 118 may be shaped as a platform 532 with the track 112 running out onto that platform 532. This allows the personnel to access the desired robotic mechanism 110a from several different sides, with access to the bottom being blocked by the platform 532, and access to the back being blocked by the housing 106.

To facilitate access to the entire desired robotic mechanism 110a, the track 112 may be provided with an open end 534. Open end 534 allows the personnel to remove the desired robotic mechanism 110a from the track 112, completely disconnecting it from the data storage library 100. With the desired robotic mechanism 110a free, maintenance is no longer constrained by the walls of the service port 516, by the housing 106, or by the track 112. After completing maintenance, the desired robotic mechanism 110a, or even a new robotic mechanism 110c (not shown) may be installed back onto the track 112 through the open end 534.

The open end 534 of track 112 provides an extra benefit in that it supports the expansion of the number of robotic mechanisms 110 within the data storage library 100. More robotic mechanisms 110 within the library increase the number of data cartridges 108 that can be moved about simultaneously. More robotic mechanisms 110 decreases the mean time required to mount or dismount a data cartridge 110. Finally, the overall library system performance impact caused by any one given robotic mechanism 110 failing is decreased when there are redundant robotic mechanisms 110 available to take its place.

The present invention may also be used with data storage libraries in which the robotic mechanism is concentrically mounted within the housing. Such robotic mechanisms usually have an arm with limited motion in the radial direction. These types of robotic mechanisms are generally incapable of moving from the interior region into the service port. Here, personnel must reach through the service port and into the interior region to access the robotic mechanism.

FIG. 7 is a partial overhead cross-sectional view of another data storage library 700 in which the robotic mechanism 710 is concentrically mounted within the housing 706. This robotic mechanism 710 includes, but is not limited to a gripper mechanism 736 mounted on an arm 738 mounted on a column 740. Control of the robotic mechanism 710 is provided by the library control unit 714. In this embodiment, the service port 716 creates a straight opening 720 through the housing 706 of the data storage library 700. A pair of doors 722 are mounted inside the service port 716 to enable and disable access through the service port 716. The doors 722 are opened and closed by a motor 724 coupled to both doors 722 through a linkage 742. The motor 724 is also controlled by the library control unit 714.

During normal operation, the doors 722 are in the closed position, as shown in FIG. 7. Closed doors 722 block all access to the interior region 104 of the data storage library 700 from the exterior region 118. The closed doors 722 prevent personnel (not shown) from accessing the data cartridges 108, and prevent man-machine collisions between the personnel and the robotic mechanism 710.

Access to the active side 730 of the robotic mechanism 710 from the exterior region 118 through the opening 720 in the service port 716 is controlled by the library control unit 714. The library control unit 714 commnands the robotic mechanism 710 to align gripper mechanism 736 adjacent to the service port 716, as shown in FIG. 8. After the gripper mechanism 736 and service port 716 are aligned, the library control unit 714 commands the motor 724 to open the doors 722. Personnel can reach through the open doors 722 and the opening 720 in service port 716 to access the active side 730 of the robotic mechanism 710 that is currently facing the exterior region 118. When maintenance is finished, the library control unit 714 commands the motor 724 to close the doors 722. After the doors 722 are closed, the robotic mechanism 710 may be moved away from the service port 716 and returned to its normal duties.

The function of blocking access to the data cartridges 108 sitting in the storage cells 102 while the doors 722 are open is provided by the geometry of the service port 716 and that of the robotic mechanism 710. The opening 720 of the service port 716 should be at least as large as the active side 730 of the gripper mechanism 736. A smaller opening 720 may not allow sufficient access to the gripper mechanism 736. Preferably, the opening 720 of the service port 716 is a few inches larger than the active side 730 of gripper mechanism 736 to allow easier access. However, the opening 720 cannot be made so large that the personnel can reach along a side the gripper mechanism 736 to reach the data cartridges 108. Shields 744 may be attached around the gripper mechanism 736 to help block the opening 720 and prevent access to anything other than the gripper mechanism 736. Preferably, the gaps between the shields 744 and the service port 716 are sufficiently narrow that a data cartridge 108 cannot fit through them.

Figure 10:
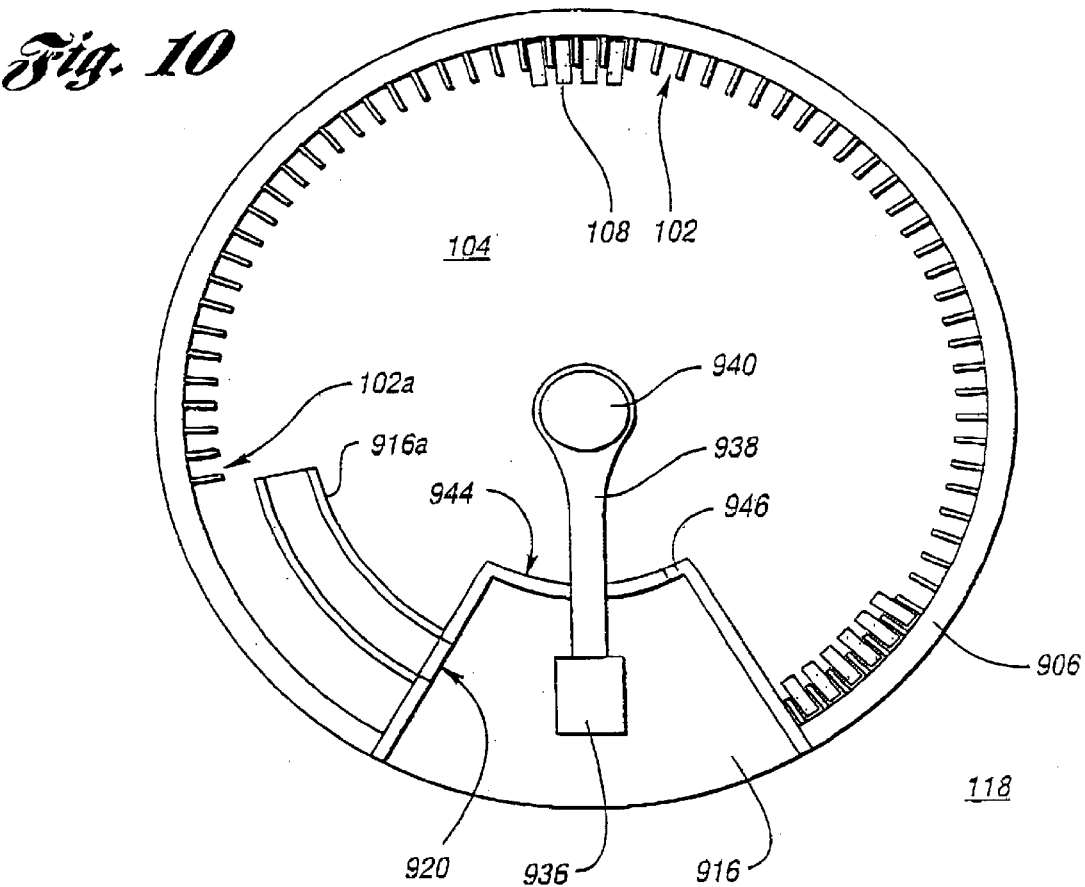
FIG. 10 is an overhead cross-sectional view of the third data storage library.

The service port may be extended radially inward into the path of the robotic mechanism as it moves through the theta direction in situations when having access to most of the gripper mechanism is desirable. FIG. 9 is a perspective view of a third embodiment of the data storage library showing this type of service port 916. FIG. 10 is an overhead cross-sectional view of the third data storage library 900. Here, the service port 916 has an opening 920 that allows the gripper mechanism 936 to pass through the housing 906 as it transitions between the interior region 104 of the library 900 and the exterior region 118.

A slit 944 is provided in the inner wall 946 of the service port 916 to accommodate the arm 938 of the robotic mechanism 910. The slit 944 and arm 938 are sufficiently narrow to prevent the personnel (not shown) from reaching through the slit 944. Preferably, slit 944 is narrower than the narrowest dimension of data cartridge 108. This prevents data cartridge 108 from entering or leaving the housing 906 through the slit 944. The gripper mechanism 936 portion of the robotic mechanism 910 enters the service port 916 by rotating counterclockwise. Removing the gripper mechanism from the service port 916 is accomplished by rotating the robotic mechanism clockwise. In an alternative embodiment, the opening 920 may be located on the right wall, top or bottom of the service port 916 and the motion of the robotic mechanism 910 adjusted accordingly.

Opening 920 gives the personnel a sufficiently wide area to insert their arms. To block this path into the interior region 104, a door (not shown) could be provided to cover the opening 920, as shown in FIGS. 2–4 and 7–8. In this particular embodiment, access to the storage cells 102 and data cartridges 108 is blocked by the geometry of the service port 916 with respect to the storage cells 102. The opening 920 is spaced a sufficient distance from all nearest storage cells 102a so that those nearest storage cells 102a are beyond arms-length reach from the exterior region 118 through the opening 920 in the service port 916. One limitation of this approach is that it disqualifies a significant area around opening 920 for positioning storage cells 102. Another limitation of this approach is that mechanical devices can be used to reach further into the interior region 104 to insert or remove data cartridges 108.

Referring to FIG. 10, one approach for further blocking access to the interior region 104 through the service port 916 is to extend the service port 916 along the interior wall of the housing 906. The service port extension is shown as element 916a in FIG. 10. Now, storage cells 102 can be mounted directly above and below the service port extension 916a to increases the capacity of the data storage library 900 while providing arms-length inaccessibility from through the opening 920 of the service port 916.

Figure 11:
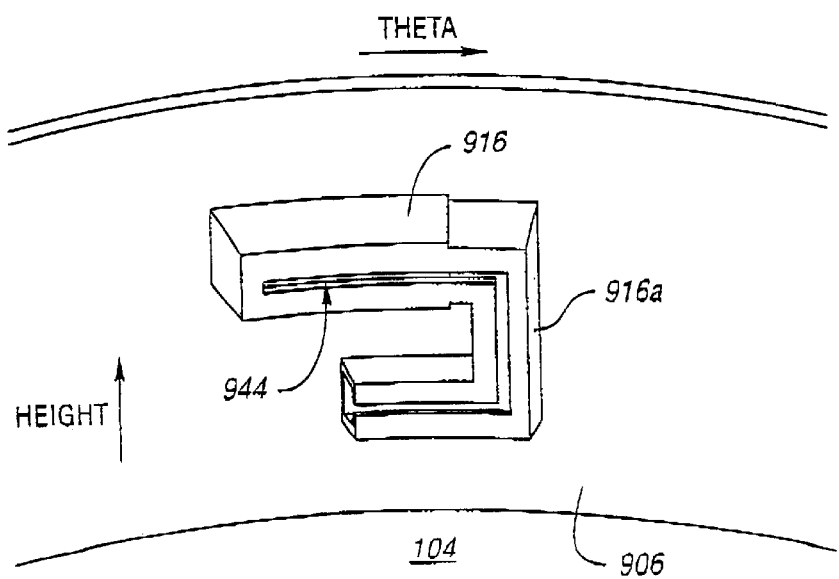
FIG. 11 is a partial view of the service port as seen from the interior of the library.

Another approach for blocking access to the interior region 104 is to curve the service port extension 916a through the height and theta directions. FIG. 11 shows one example wherein the service port extension 916a has two right angle turns. These turns block access to the interior region 104 of the data storage library 900 from through the service port 916. Other types of curves may be used to achieve the same blocking functionality within the scope of the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A data storage library comprising:

a housing defining an exterior and an interior region;

a robotic mechanism disposed in the interior region;

a plurality of storage cells disposed in the interior region for storing data cartridges;

a service port disposed through the housing for permitting access to at least part of the robotic mechanism from the exterior region; and a door disposed across the service port, the door having a closed position for disabling access to the interior region from the exterior region and an open position for enabling access to the at least part of the robotic mechanism from the exterior region, wherein the door opens automatically to enable access to the at least part of the robotic mechanism and access to the interior region from the exterior region is automatically disabled when access to the at least part of the robotic mechanism is enabled, and wherein, to automatically disable access to the interior region from the exterior region when access to the at least part of the robotic mechanism is enabled, the door closes automatically to block access to the interior region from the exterior region.

2. The data storage library of claim 1 further comprising a track traversing the service port, wherein the robotic mechanism is operative to move along the track traversing the service port to permit service of the robotic mechanism from the exterior region.

3. The data storage library of claim 2 further comprising a sensor for sensing a position of the robotic mechanism on the track and generating a signal for use in automatically opening the door when the robotic mechanism is proximate the door.

4. A data storage method comprising:

providing a housing defining an exterior and an interior region;

providing a robotic mechanism disposed in the interior region;

providing a plurality of storage cells disposed in the interior region for storing data cartridges;

providing a service port disposed through the housing for permitting access to at least part of the robotic mechanism from the exterior region; and providing a door disposed across the service port, the door having a closed position for disabling access to the interior region from the exterior region and an open position for enabling access to the at least part of the robotic mechanism from the exterior region, wherein the door opens automatically to enable access to the at least part of the robotic mechanism and access to the interior region from the exterior region is automatically disabled when access to the at least part of the robotic mechanism is enabled, and wherein, to automatically disable access to the interior region from the exterior region when access to the at least part of the robotic mechanism is enabled, the door closes automatically to block access to the interior region from the exterior region.

5. The data storage method of claim 4 further comprising a track traversing the service port, wherein the robotic mechanism is operative to move along the track traversing the service port to permit service of the robotic mechanism from the exterior region.

6. The data storage library of claim 5 further comprising providing a sensor for sensing a position of the robotic mechanism on the track and generating a signal for use in automatically opening the door when the robotic mechanism is proximate the door.

* * * * *